（12） United States Patent
Naderer et al.

(10) Patent No.: US 9,375,840 B2
(45) Date of Patent: Jun. 28, 2016

(54) ACTIVE HANDLING APPARATUS AND METHOD FOR CONTACT TASKS

(75) Inventors: Ronald Naderer, St. Florian (AT); Paolo Ferrara, Kematen An der Kremms (AT); Andreas Rohrhofer, St. Peter/Au (AT)

(73) Assignee: Ferrobotics Complaint Robot Technology GmbH, Linz (AT)

( * ) Notice: Subject to any disclaimer, the term of this patent is extended or adjusted under 35 U.S.C. 154(b) by 113 days.

(21) Appl. No.: 14/005,369

(22) PCT Filed: Mar. 15, 2012

(86) PCT No.: PCT/EP2012/054596
§ 371 (c)(1),
(2), (4) Date: Sep. 16, 2013

(87) PCT Pub. No.: WO2012/123552
PCT Pub. Date: Sep. 20, 2012

(65) Prior Publication Data
US 2014/0005831 A1  Jan. 2, 2014

(30) Foreign Application Priority Data

Mar. 16, 2011 (DE) .......................... 10 2011 005 627
Apr. 1, 2011  (DE) .......................... 10 2011 006 679

(51) Int. Cl.
B25J 9/14   (2006.01)
B25J 9/16   (2006.01)
(Continued)

(52) U.S. Cl.
CPC ............ B25J 9/1633 (2013.01); B25J 11/0065 (2013.01); B25J 17/0208 (2013.01);
(Continued)

(58) Field of Classification Search
CPC .... B25J 9/1612; B25J 9/1633; B25J 17/0208; G05B 2219/49356; G05B 2219/49357; G05B 2219/37355; G05B 2219/39319; G05B 2219/39577
See application file for complete search history.

(56) References Cited

U.S. PATENT DOCUMENTS 5,112,338 A * 5/1992 Anspach, III ................... 606/99
5,448,146 A  9/1995 Erlbacher
(Continued)

FOREIGN PATENT DOCUMENTS

DE  102008050519 A1 * 4/2010 ............... B25J 17/02
DE  102010003697 A1  10/2011
(Continued)

OTHER PUBLICATIONS

Author Not Named, "Aktiver Kontaktflansch", Dec. 2010, FER Robotics GmbH, Austria.
(Continued)

*Primary Examiner* — Spencer Patton
(74) *Attorney, Agent, or Firm* — Laurence A. Greenberg; Werner H. Stemer; Ralph E. Locher

(57) ABSTRACT

A handling apparatus for automated or robot-supported contact tasks is disclosed. The handling apparatus has the following components: a mechanical interface for releasably or fixedly connecting the handling apparatus to a manipulator; a holder, which is movable in relation to the interface, for holding a tool; at least one static-frictionless adjusting element for positioning the holder in relation to the interface to the manipulator; a sensor device for directly or indirectly measuring the force acting on the at least one adjusting element; and a closed-loop controller which is configured to regulate the contact force depending on a predefinable force profile when there is contact between the handling apparatus and a surface.

24 Claims, 6 Drawing Sheets

(51) Int. Cl.
  *B25J 11/00* (2006.01)
  *B25J 17/02* (2006.01)

(52) U.S. Cl.
  CPC ............... *G05B2219/39319* (2013.01); *G05B 2219/39349* (2013.01); *G05B 2219/39577* (2013.01); *G05B 2219/49356* (2013.01); *Y10S 901/09* (2013.01)

(56) References Cited

U.S. PATENT DOCUMENTS 5,509,848 A  4/1996  Shimbara
6,390,888 B1  5/2002  Amano et al.
2003/0132726 A1  7/2003  Dohring et al.

FOREIGN PATENT DOCUMENTS

EP  1057592 A1  12/2000
JP  H077890 U  2/1995
JP  H11207613 A  8/1999

OTHER PUBLICATIONS

German Patent and Trademark Office, Office Action Dated Nov. 30, 2011.

\* cited by examiner (a)

(b)

(c)

(a)

(b)

ACTIVE HANDLING APPARATUS AND METHOD FOR CONTACT TASKS

BACKGROUND OF THE INVENTION

Field of the Invention

The invention relates to an active handling apparatus as well as to a method for automated contact tasks (manipulating and positioning tasks) such as, for example, the robot-supported processing of surfaces or the manipulation of machine elements or workpieces during operations such as, for example, mounting, stacking, sorting, etc.

Different apparatuses are known for robot-supported, automated contact tasks such as, for example, the processing of surfaces (grinding, polishing, etc.) as well as the manipulation of workpieces or machine elements (stacking, palletizing, mounting, etc.). The grinding apparatus described in publication U.S. Pat. No. 5,299,389 can be named as an example. In the case of said apparatus, a rotating grinding disk is moved toward the surface to be ground by means of an industrial robot. The contact between the grinding disk and the surface is recognized by means of the load current of the motor driving the grinding disk, which provides a method which is too imprecise for many applications. In general, in the case of robot-supported automated systems where the robot contacts an object, the problem is of recognizing the moment of contact and closed-loop controlling the contact force.

Even in the case of modern, force-regulated systems, when the tool which is mounted on the robot contacts the surface to be contacted a shock-shaped contact force occurs which may not be a problem in many cases, but in applications where precision is key or where very sensitive workpieces have to be processed or treated, it is extremely troublesome and undesirable. It is only possible to regulate the contact force once the robot has contacted the surface, and consequently in practical applications the mentioned shock-shaped contact force is a necessary evil which can certainly be reduced (for example by inserting a passively flexible element in the drive train) but cannot be eliminated. Passive flexibility in the manner of a spring, however, acts in an uncontrolled manner and can disturb the desired process progression.

Known force-regulated systems are frequently not able to react quickly enough in the case of very rapid (i.e. high-frequency) disturbances, such as, for example, jerks or impacts, as the regulated drive train has a certain inertia which results in a corresponding reaction time. In the case of rigid systems (such as, for example, standard industrial robots) the smallest displacements if effected too quickly consequently already result in a high increase in the force.

BRIEF SUMMARY OF THE INVENTION

The object underlying the invention is to provide an active handling apparatus (effector) for a manipulator, said handling apparatus being realized for the purpose of contacting surfaces in a practically jolt-free manner and subsequently of closed-loop controlling the contact force in a jerk-free manner.

The object is achieved through the apparatus as claimed. Different exemplary developments and uses of the apparatus are the object of the dependent claims.

A handling apparatus for automated contact tasks is described. As claimed in one example of the invention, the handling apparatus has the following components: a mechanical interface for releasably or fixedly connecting the handling apparatus to a manipulator; a holder, which is movable in relation to the interface, for receiving a tool; at least one gearless, in particular static-frictionless adjusting element, for positioning the holder in relation to the interface to the manipulator; a sensor device for directly or indirectly determining the force acting on the at least one adjusting element; and a closed-loop control device which is realized for the purpose of

- pressing the holder at an adjustable minimum force ($F_0$) against a stop as long as there is no contact between the handling apparatus and a surface, and
- closed-loop controlling the contact force according to a predeterminable force progression when there is contact between the handing apparatus and the surface, wherein once contact has been recognized, the contact force is increased from the minimum force ($F_0$) to a predeterminable required force ($F_{REQUIRED}$).

A prerequisite for the freedom from static-friction and jerking of the adjusting element is the use of gearless actuators. These types of actuators are, for example, pistonless, pneumatic actuators (cushion-type pneumatic cylinders and pneumatic muscles), pneumatic cylinders with a piston mounted in a static-frictionless manner (for example a glass cylinder with a graphite piston) and gearless, electric linear units with an armature mounted in a static-frictionless manner (for example air-bearing or magnetic-bearing) armatures. In the passive (i.e. non-regulated) case, very flat force-displacement characteristic curves of the handling apparatus can be achieved using these types of actuators.

The invention is explained below by way of the exemplary embodiments shown in the following figures.

Identical references in the figures designate identical or similar components with identical or similar meaning.

DESCRIPTION OF THE INVENTION

Figure 1:
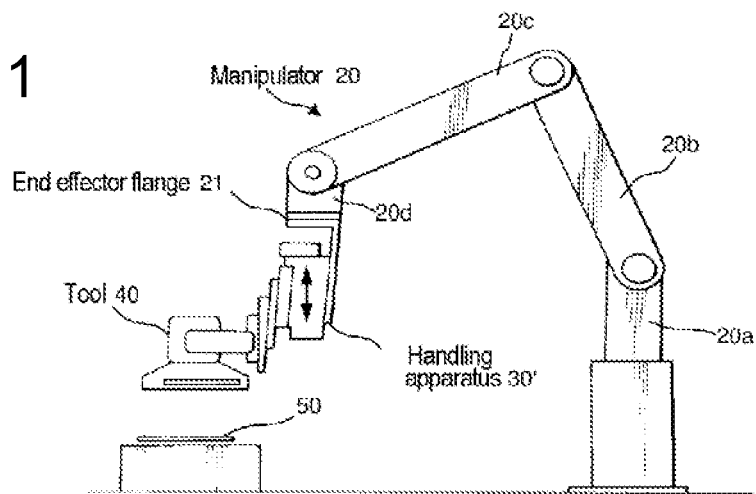
FIG. 1 shows a representation of a robot-supported automated grinding device with a manipulator, a grinding machine and a handling apparatus for the grinding machine which is arranged between the manipulator and the grinding machine.

As an example of the invention, FIG. 1 shows a representation of a robot-supported automated grinding device with an industrial robot as a manipulator 20, a grinding machine 40 as a workpiece and a handling apparatus 30', which is arranged between an end effector flange 21 of the manipulator 20 and the tool 40, is used substantially for precision control or for closed-loop controlling in a precise manner the movement of the tool 40 in relation to a workpiece 50 to be processed as well as for closed-loop controlling the force exerted onto the workpiece 50 by the tool 40. The construction of the manipulator 20 is of secondary importance below. A standard industrial robot with four arm segments 20a, 20b, 20c and 20d is used in the present example. The task of the manipulator essentially consists in the positioning of the tool 40 in an operating position on or above the workpiece 50 to be processed. Closed-loop controlling the position in a precise manner and in particular closed-loop controlling the force in a precise manner is carried out by means of the handling apparatus 30'. This latter is realized in the present case for the purpose of moving the tool 40 (grinding machine) toward the workpiece 50 and, on contact, for exerting a contact force onto the workpiece 50. Thus, for example, a grinding disk of the grinding machine is able to be pressed onto the workpiece 50 at a certain force in order, for example, to obtain a certain grinding effect. As a result of closed-loop controlling the force, the force can then also be held, for example, constant if the grinding disk is partly worn. For controlling the force it is necessary to determine a measuring variable for the contact force, which can be realized, for example, by means of a load cell or by means of the motor current of the grinding machine. The example of an automatic grinding device shown in FIG. 1 is explained in more detail, for example, in publication U.S. Pat. No. 5,299,389.

Precise positioning of the tool 40 as well as controlling the force with just the manipulator would be possible, in principle, but said tasks place very high demands on the manipulator. Precise positioning as well as controlling the force in an exact and rapid manner, as is required, for example, for many contact tasks, is only possible using very expensive manipulators. For this reason, a handling apparatus, which takes over the abovementioned positioning and force regulating task, is situated between the end effector flange of the manipulator and the actual tool (e.g. grinding or polishing machine, gripper, etc. . . . ). The accuracy demands on the manipulator can then be relatively small. Such types of handling apparatuses are also called "active flanges".

In general in the case of robot-supported or automated systems where the robot contacts an object, the problem is recognizing the moment at which contact is made and regulating the contact force. It is not possible to regulate the contact force until the robot has contacted the surface. For this reason, in the case of all known force-regulated systems, a shock-shaped contact force occurs initially when contact is made between the tool mounted on the robot and the surface to be contacted. In the case of said collision, not only the mass (i.e. the inertia and consequently the kinetic energy) of the tool and of the handling apparatus, but also the mass or the kinetic energy of the entire manipulator together with the drives thereof is present. Said mass essentially determines the impact energy (to be avoided).

The resultant shock-shaped contact force may not be a problem in many cases, however in applications where precision is key or very sensitive workpieces have to be processed or treated, it is extremely disturbing and undesirable. This means that the actual force overshoots in comparison to the required force progression. Also during the processing of a surface (or during the handling of an object) the position of the tool has to be adjusted in order to maintain the required contact force. In this case, above all it is the effects of static-friction (the co-called "stick-slip effect") which can lead to transient overshooting in the contact force progression. In addition, in the case of geared drives the meshing of the teeth of the gear wheels can cause unwanted jerky impacts of vibrations. When handling or processing objects, both effects can lead to problems in the quality.

The above-explained overshooting is usually reduced in robotics by inserting passive elastic elements into the drive train. Said elements, however, act in an uncontrolled manner and are consequently not usable for precise handling and contact tasks, as their mechanically defined performance characteristic (force-displacement characteristic curve) is fixedly predetermined and is not controllable in an automated manner.

Figure 2:
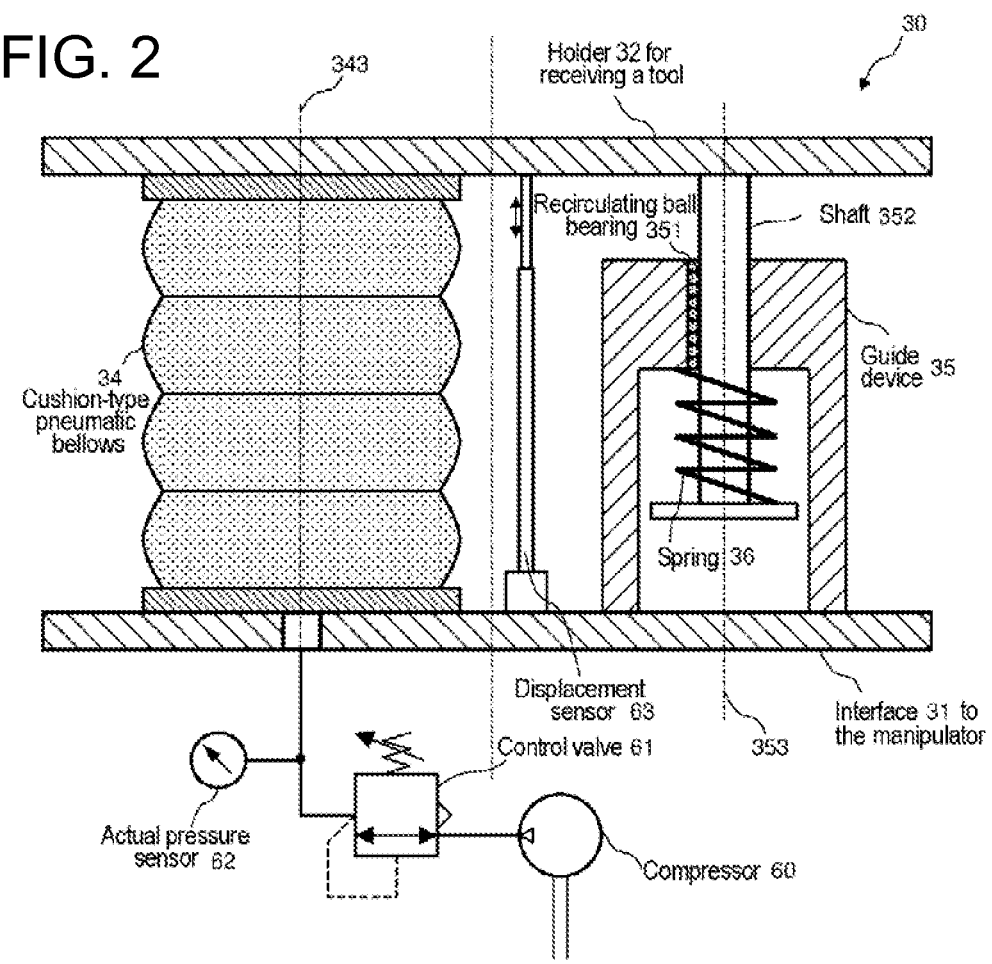
FIG. 2 illustrates by way of a schematic diagram an example of a handling apparatus as claimed in the invention with one degree of freedom, a cushion-type pneumatic cylinder working in opposition to a spring force being provided as an actuator.

FIG. 2 shows an example of a handling apparatus (active flange) as claimed in the present invention. A first flange part of the apparatus forms an interface 31 to a manipulator (for example to the end effector flange 21 of the manipulator 20 from FIG. 1). A second flange part 32 forms a holder 32 for a tool (such as, for example, a grinding machine or a gripping means). A static-frictionless linear actuator which, in the present example is realized as a cushion-type pneumatic cylinder 34, is arranged between the two flange parts. Static-frictionless actuators are, for example, cushion-type pneumatic cylinders and pneumatic artificial muscles (PAMs). As an alternative to this, it is also possible to use pneumatic cylinders with a piston mounted in a static-frictionless manner which usually consist of glass and operate with a graphite piston. A further alternative is provided by electric direct drives, in particular gearless linear drives which are mounted in a static-frictionless manner (e.g. by means of ball-bearings, magnetic or air-cushion bearings). These types of drives are also inherently elastic, either as a result of the compressibility of the air (in the case of pneumatic actuators) or as a result of the magnetic restoring force (in the case of electric direct drives).

The apparatus additionally includes a guide device 35 which blocks all the degrees of freedom of movement, with the exception of the degree of freedom of movement of the static-frictionless linear actuator 34. The guide device 35 must also not allow any notable static-friction between it and the shaft 352 guided therein. Said freedom from static-friction can be ensured, for example, by the use of roller bearings such as, for example, linear ball bearings, in particular recirculating ball bearings. In the example shown in FIG. 2, a rotationally fixed shaft guide 35, 352 is provided with recirculating ball bearing 351. Consequently, the handling apparatus has precisely one degree of freedom, namely a translatory movement in the direction of the longitudinal axis 353 of the shaft guide 35 which lies naturally parallel to the longitudinal axis 343 of the linear actuator (cushion-type pneumatic cylinder 34).

A compressor 60 generates the necessary overpressure in the pneumatic system in order to drive the pneumatic linear actuator 34. In this case, the cushion-type pneumatic cylinder 34 shown in FIG. 2 can only generate a compression force on extension. The abovementioned pneumatic artificial muscle, in contrast, only generates a tensile force on contraction. For this reason, a restoring force, which is provided, for example, by a (tensile or compression) spring, has to act on the linear actuator. In the example from FIG. 2, the shaft 352 of the shaft guide is held back by the compression spring 36 such that a pre-stressed force acts on the top flange part (holder 32) in the direction of the bottom flange part (interface 31 to the manipulator). The linear actuator 34 is moved actively in opposition to said pre-stressed force. The overpressure in the linear actuator 34 is generated by means of the compressor 60 and is adjustable by means of an electronically actuated control valve 61 in accordance with a required value (required pressure). The actual pressure in the linear actuator 34 (actual pressure) is measured using a pressure sensor 62. In addition, a linear potentiometer is provided as a displacement sensor 63 which supplies a measured value for the current deflection of the linear actuator 34 and consequently the relative position of the holder 32 (in relation to the interface 31 to the manipulator or in relation to the end effector flange of the manipulator).

The pressure-dependent force-displacement characteristic curve of the pneumatic linear actuator is usually known such that the actuator force provided by the linear actuator 34 on the flange parts 31 and 32 is accessible to indirect measuring. I.e. the actuator force can easily be calculated from the measured pressure in the actuator and the measured deflection (lift) of the actuator. In this case, the force-displacement characteristic curve of pneumatic linear actuators is usually provided with a hysteresis such that the direction of the movement is also included in the force calculation. In the case of a electric direct drive the actuator force could, for example, be determined in a similar manner by means of a characteristic curve e.g. by means of current consumption.

The restoring spring force can also be calculated from the force-displacement characteristic curve of the spring and of the measured deflection. If a tool which is fastened on the holder 32 of the handling apparatus contacts a workpiece, the difference between the actuator force and the restoring force is then the net force exerted onto the tool which is able to be regulated in a conventional manner. In order to determine from this the force which actually acts on the surface, the weight of the tool 40 (cf. FIG. 1) and its spatial position in relation to the surface of the workpiece must additionally be taken into consideration.

It is possible to regulate the position just with the measured value for the deflection of the actuator 34 without any contact. In addition, the flexibility (or rigidity) of the handling apparatus 30 can be regulated (impedance regulating), i.e. the rigidity of the arrangement produced from the linear actuator and the restoring spring is regulated in accordance with a required value.

As a result of the elasticity inherent to a pneumatic actuator and the freedom from static-friction of the arrangement, the aforementioned overshooting of the contact force is reduced to a minimum. As a result of said elastic performance characteristic, the mass and inertia of the moved elements of the manipulator (robot arms and drives) is uncoupled from the tool and as a result from the workpiece in the effective direction of the elasticity. Consequently, only the much smaller mass of the tool is decisive to the kinetic energy. This reduces the impact energy already mentioned further above when there is contact between the workpiece and the tool.

In addition, as a result of the freedom from static-friction and of the gearless drive, overshooting of the contact force is practically completely eliminated in operation when there is active force regulation. Regulating the force in a jerk-free manner is therefore made possible whereas, in the case of conventional handling apparatuses, unwanted variations always occur in the contact force as a result of the effects of static-friction, it not being easily possible to compensate for said unwanted variations by means of regulation.

Figure 3:
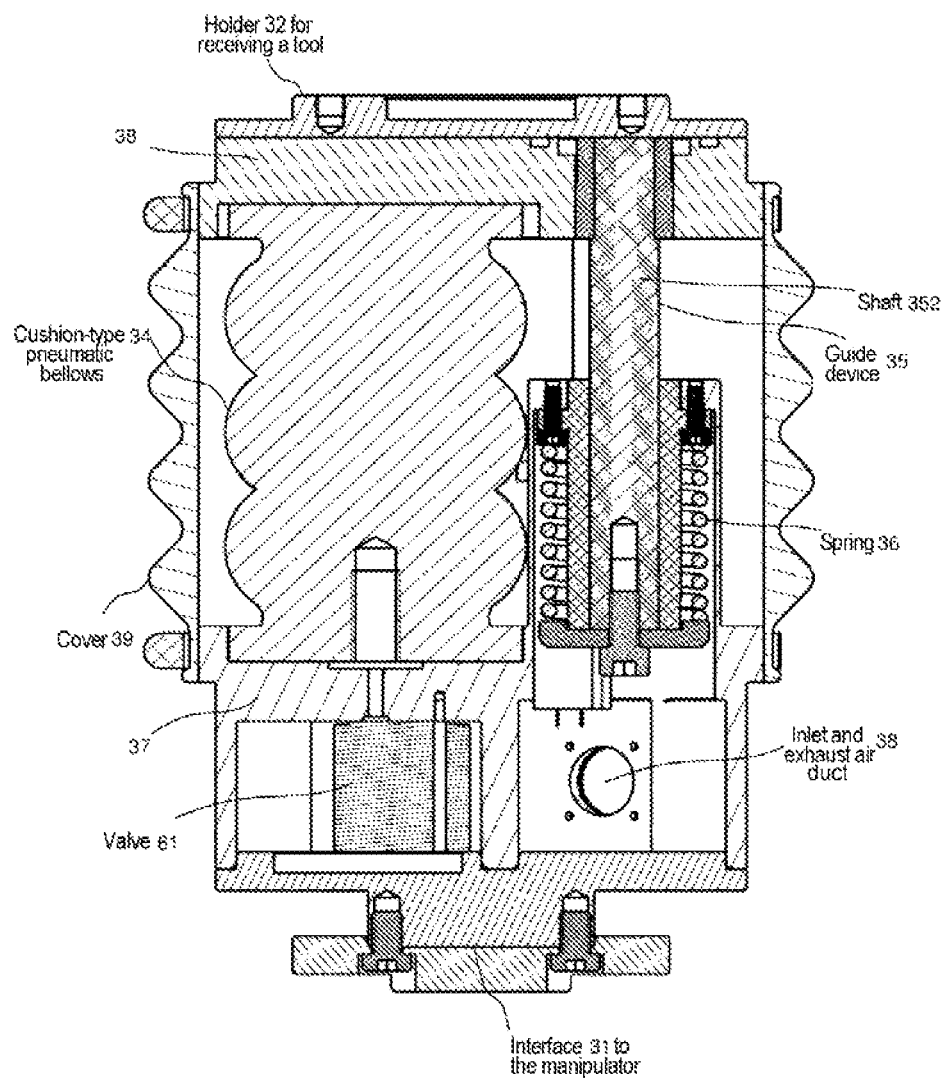
FIG. 3 shows a detailed sectional representation through a handling apparatus which is constructed according to the example from FIG. 2.

FIG. 3 shows a detailed sectional representation through the handling apparatus which is constructed according to the principle shown in FIG. 2. The active flange shown includes a first flange part 31 as the interface to the manipulator, the end effector flange 21 of which is shown, for example, in FIG. 1, as well as a second flange part 32 as the holder or receiving means for a tool. The geometry of the two flange parts is standard in robotics. A housing part 37, in which both the control valve 61 and the static-frictionless shaft guide are arranged with a restoring spring in accordance with the same principle as shown in FIG. 2, is rigidly connected to the first flange part 31. For protection against dust and other contaminants, a shock absorber is provided as a cover 39 between the flange parts 31 and 32. Said cover can also be realized in a liquid and/or dust tight manner for use under water, in a rough environment or in clean rooms. The cushion-type pneumatic cylinder 34 serves as the static-frictionless, gearless linear actuator. The linear actuator is arranged between the first housing part 37 and a second housing part 38 which is rigidly connected to the holder 32.

The displacement sensor 63 shown in FIG. 2 is covered in the present example by the guide device 35 and cannot be seen. The pressure sensor and the compressor are not included in the representation from FIG. 3 for reasons of clarity. Connections for the inlet air duct and exhaust air duct 38 can be arranged, for example, in the first housing part 37. The connection to the inlet air duct is, for example, connected to the compressor 60 via a hose. The connection for the exhaust air duct is, for example, covered by a sound absorber. For underwater applications, as claimed in one example of the invention, the exhaust air duct can also be connected to a hose which directs the exhaust air as far as up to the surface of the water in order to prevent ingress of water into the pneumatic system. As a result of the exhaust air duct being realized as a hose, exhaust air is also prevented from flowing out in the case of sensitive processes.

Figure 4:
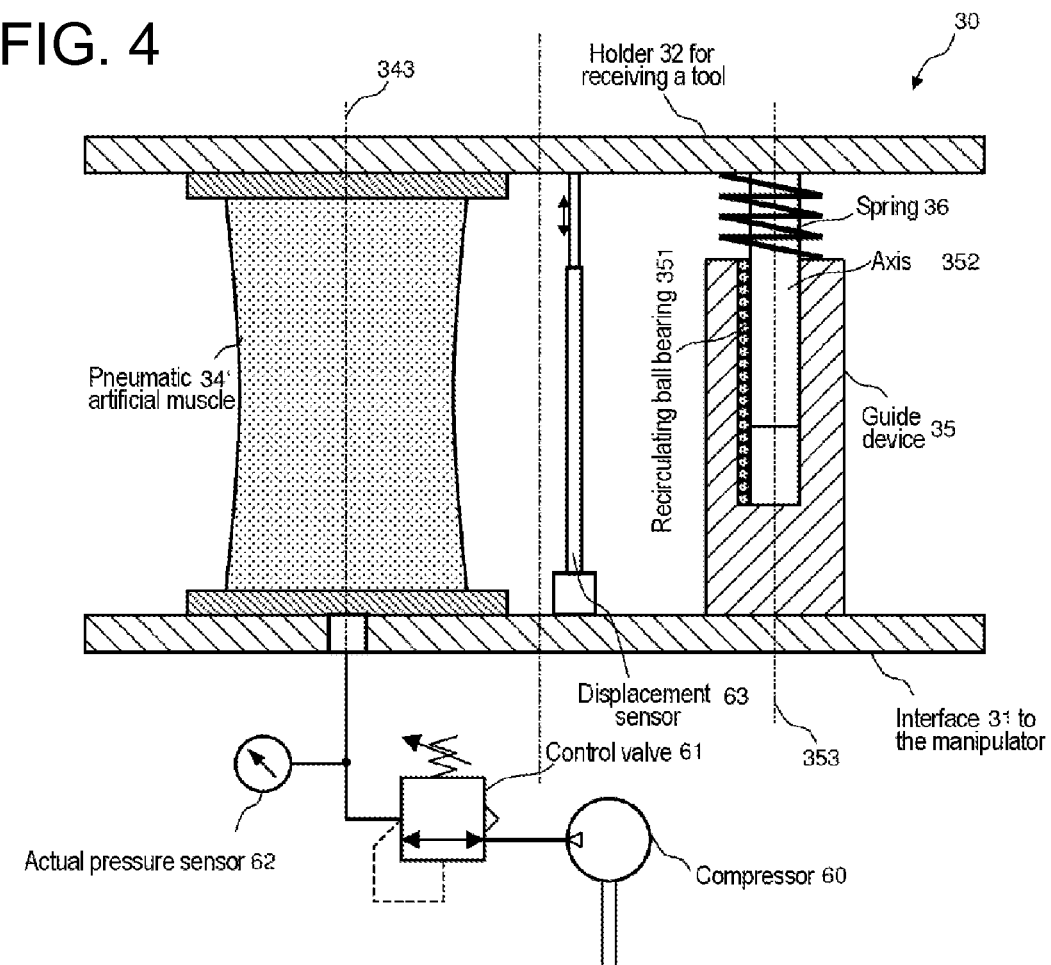
FIG. 4 illustrates by way of a schematic diagram a further example of a handling apparatus as claimed in the invention with one degree of freedom, a pneumatic muscle working in opposition to a spring force being provided as an actuator.

FIG. 4 shows a further example of a handling apparatus as claimed in the invention, where a pneumatic artificial muscle 34' is used in place of a cushion-type pneumatic cylinder. The spring 36 in the case of said example is arranged such that the two flange parts 31, 32 (the holder and the interface to the manipulator) are pressed apart from one another, whilst the pneumatic artificial muscle 34' exerts a tensile force which is directed in opposition to the spring force. For the rest, the arrangement from FIG. 4 is designed in an identical manner to the example shown in FIG. 2. In the pressure-free state, the apparatus from FIG. 4, however, moves into an end position at maximum deflection, whereas the apparatus from FIG. 2 moves into an end position at minimum deflection (i.e. distance between the flange parts 31 and 32), which can be advantageous for safety reasons.

Quite generally speaking, the advantage of the apparatus as claimed in the invention, among others, is that in the case of loss of energy, the system is pulled back into a start position and nevertheless remains passively movable. Even after an emergency shutdown (e.g. on account of exceeding an admissible maximum force) the apparatus remains passively supple and any possibly jammed parts are able to be released.

Figure 5:
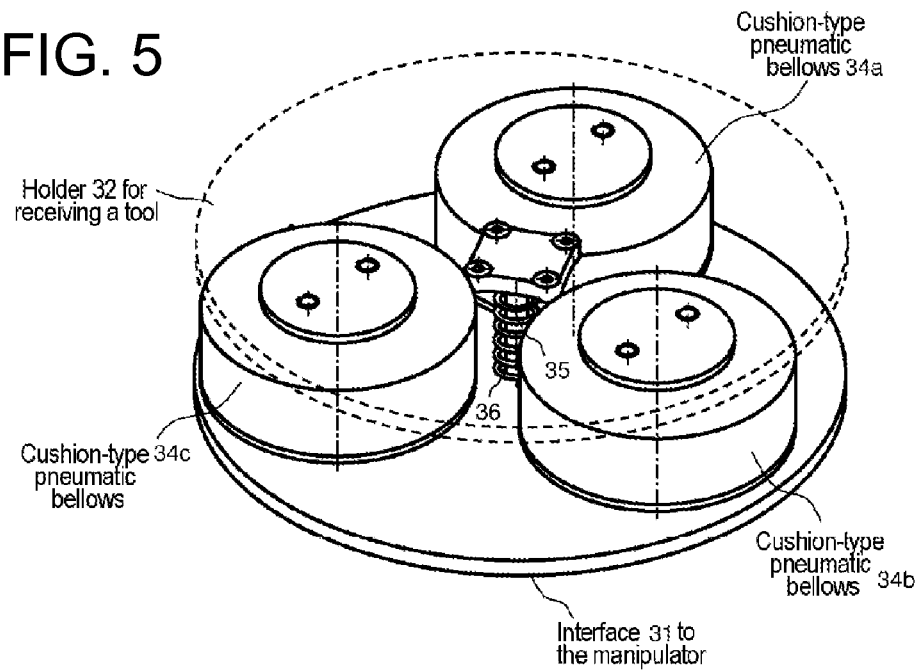
FIG. 5 illustrates by way of a schematic diagram a further example of a handling apparatus as claimed in the invention with three degrees of freedom, three cushion-type pneumatic cylinders working in opposition to a spring force being provided as the actuators.

FIG. 5 shows a simplified representation of a further example as claimed in the present invention. The handling apparatus (active flange) shown in FIG. 5 has three degrees of freedom compared to the examples shown in FIGS. 2 to 4, namely one translatory degree of freedom (displacement in the direction of the longitudinal axes of the cushion-type pneumatic cylinders 34a, 34, 34c) and two rotational degrees of freedom (tilting about two rotational axes which lie normally with respect to the longitudinal axes of the cushion-type pneumatic cylinders 34a, 34, 34c). In the case of three degrees of freedom, it is also necessary to have three static-frictionless pneumatic linear actuators 34a, 34, 34c which are arranged in the present case evenly around a center axis of the handling apparatus. The remaining design of the handling apparatus such as, for example, the actuation of the static-frictionless pneumatic linear actuators is, in principle, identical to the examples from FIGS. 2 to 4. The static-frictionless guide device 35 is also constructed in a substantially identical manner to the example from FIG. 4 (in the present case, a tension spring 36' being used to generate a restoring force for the cushion-type pneumatic cylinder), however, the guide shaft 352 is not rigidly connected to the top flange part (which forms the holder 32), but is connected, for example, by means of a ball joint or a Cardan joint (not shown) in order to make the abovementioned tilting movement possible. Depending on the application, the joint can be rotationally fixed such that (as in the present example) only tilting movements of the top flange part are possible but not rotation.

The restoring force does not in principle have to be generated by a spring, but could also be provided by a second static-frictionless pneumatic linear actuator. Thus, for example, in the example from FIG. 2 a pneumatic artificial muscle (PAM, cf. FIG. 4) which is arranged parallel to the cushion-type pneumatic cylinder could also be used instead of the spring 36. As an alternative to this, the use of a double-acting static-frictionless pneumatic cylinder is also possible.

Figure 6:
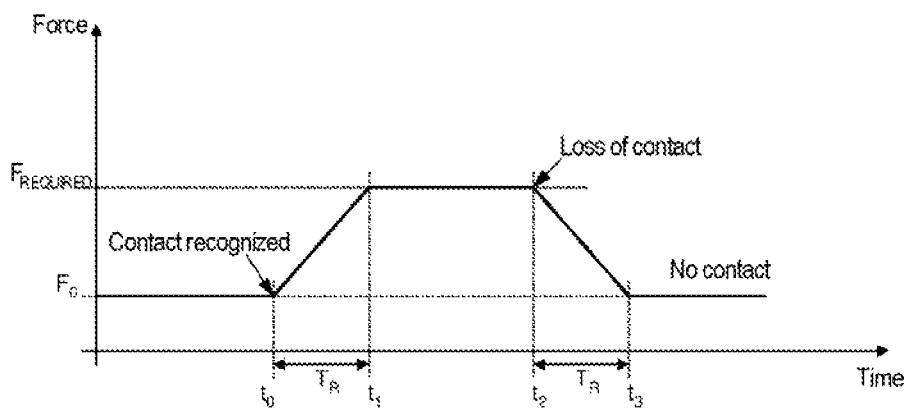
FIG. 6 illustrates the regulated force progression when producing contact between the tool and the workpiece as well as loss of contact.
Figure 6:
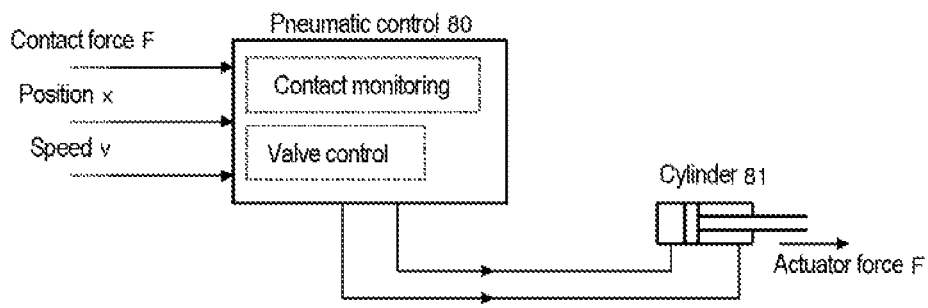
Figure 6:
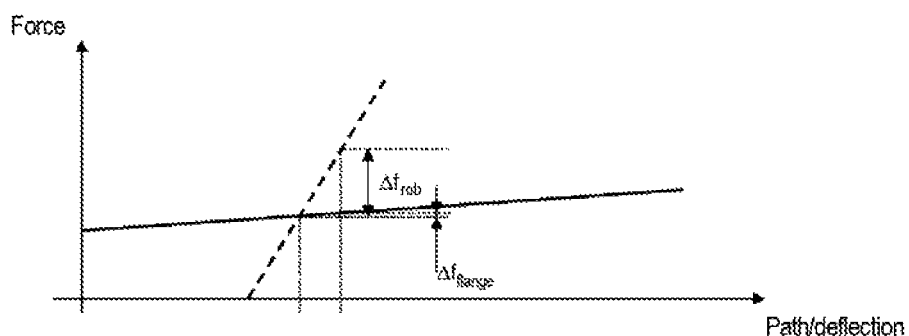

In FIG. 6, the regulating of the handling apparatus as claimed in one example of the invention is explained again in detail. FIG. 6a shows the (regulated) contact force progression as claimed in one example of the invention, FIG. 6b shows a schematic representation of the control means 80 (closed-loop control device) of the actuator which drives the handling apparatus, in the present case a double-acting pneumatic cylinder 81 with pistons which slide in the cylinder in a practically static-frictionless manner. FIG. 6c illustrates the advantage of the very flat force-displacement characteristic curve of the handling apparatus in the passive (non-regulated) case such that the impact forces on contact with the workpiece are very slight.

In FIG. 6a the force F(t) exerted on the workpiece by the handling apparatus 30 is shown over the progression of time, the force F being regulated to a minimum value $F_0$ when there is no contact between the handling apparatus 30 and the workpiece 50 (cf. FIG. 1). The minimum force $F_0$ can be approximately zero, just large enough for the handling apparatus 30 to remain still fully extended (or, depending on the direction of force, fully retracted). In said state, contact monitoring, which activates the regulating of the contact force when a contact is produced, is active. In the example shown in FIG. 6a, at moments t<t0 and t>t3 there is no contact between the handling apparatus 30 and the workpiece 50 (more precisely, the contact occurs indirectly by means of the tool 40 which is mounted on the handling apparatus) and the pneumatic control means 80 holds the holder 32 of the handling apparatus (cf. FIG. 2) at minimum force $F_0$ against an end stop. In the present example, contact is recognized at moment t0. In order to ensure as "supple" a contact as possible, a very small starting force $F_0$ (ideally zero) is necessary, once contact has been recognized the holder 32 of the handling apparatus 30 is no longer against the end stop and the contact force is increased linearly until up to a required force $F_{REQUIRED}$ which is desired or necessary for the respective contact task (e.g. polishing, grinding, etc.). The increase in force from the minimum force $F_0$ to a required force $F_{REQUIRED}$ is effected inside a defined time interval TR. In the present example, the required force is obtained at moment t1 and the workpiece 50 is processed (or handled in another manner) by means of the handling apparatus. During this latter, contact monitoring by the control means 89 is active again in order to recognize possible loss of contact.

In the present example, such loss of contact occurs at moment t2. As reaction to this, the holder 32 of the handling apparatus 30 is moved against the end stop again and the control means reduces the force inside a time interval $T_R$ from the required force $F_{REQUIRED}$ to the abovementioned minimum force $F_0$ in order to develop new contact once again in as "supple" a manner as possible. In the present case, the ramp-shaped increase after contact and the ram-shaped drop in force after loss of contact are the same length (in both cases $T_R$). Depending on the application, the drop in force on loss of contact can also be effected more rapidly (e.g. force withdrawn as quickly as possible by means of pressureless switching of the pneumatic cylinder).

FIG. 6c illustrates the mentioned gentle contact between the handling apparatus and the workpiece by way of a force-displacement characteristic curve. The passive (i.e. non-regulated) force-displacement characteristic curve of the handling apparatus can be set in a very flat manner (continuous characteristic curve) by means of a suitable mechanical structure of the handling apparatus as mentioned above. It will be possible to obtain values of, for example, only three Newton per millimeter displacement. In comparison with this, known force-regulated systems are relatively rigid and are not able to react quickly enough in the case of very rapid (i.e. high-frequency) disturbances, such as, for example, jerks or impacts, as the regulated drive train has a certain inertia, which results in a corresponding reaction time. In the case of rigid systems (such as, for example, standard industrial robots) the smallest displacements Δs, when they are effected too rapidly, consequently already result in a high increase $\Delta f_{rob}$ in the force, whereas the handling apparatus as claimed in the invention, as a result of its flat characteristic curve, brings about a negligibly small change in force $\Delta f_{flange}$ and the regulating of the force is gently inserted only once contact has been recognized.

Details of different possibilities for contact recognition and for recognizing loss of contact are given again below. The abovementioned minimum force $F_0$ and the required force $F_{REQUIRED}$ always have the same preceding sign and the holder 32 always moves against the respective end stop when there is lack of contact. Said end position can be recognized, for example, by means of the displacement sensor 63 (see FIG. 2). When the holder 32 of the handling apparatus 30 is situated in an end stop, it can be assumed from this every time that there is no contact between the handling apparatus 30 and the workpiece 40.

Proceeding from said state (holder 32 against an end stop), contact is detected as soon as the holder 32 moves in opposition to the required force $F_{REQUIRED}$ (for example a change in position detected by the displacement sensor 63) in relation to the manipulator interface 31. As at this moment the force is regulated to a minimum value $F_0$ and as a pneumatic actuator basically has a natural flexibility, the contact is very gentle and there are no jerks between the handling apparatus 30 and the workpiece 50.

Loss of contact is recognized, for example, whenever the change in the speed of the holder 32 of the handling apparatus 30 exceeds a predeterminable acceleration value. The speed of the holder 32 with reference to the manipulator interface 31 at the moment of the loss of contact is stored. If said speed is fallen below again (without an end stop being approached), once again contact is recognized. The change in speed can be measured either by means of the displacement sensor 62 or by using an acceleration sensor.

Figure 7:
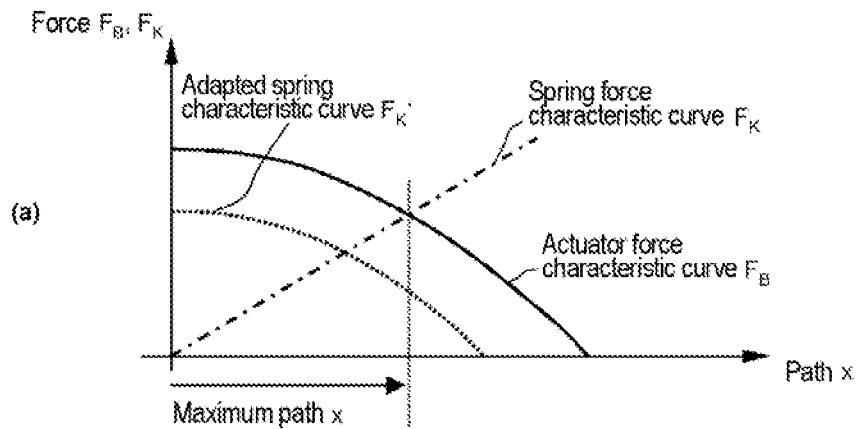
FIG. 7 illustrates the force-displacement characteristic curves of springs and cushion-type pneumatic cylinders as well as an adapted spring characteristic curve.

A problem occurring in a good many practical applications results from the non-identical force-displacement characteristic curves of the cushion-type pneumatic cylinder or the pneumatic artificial muscle and the spring (cf. characteristic curve diagram in FIG. 7). Whilst springs generally have a restoring force which increases linearly (from the relaxed state) as the deflection increases, cushion-type pneumatic cylinders (as well as pneumatic artificial muscles) have a falling characteristic curve with significant non-linearity at a given internal pressure. The example from FIG. 2 or 3 is looked at below. The contact force acting on a surface to be contacted, in the steady state, is equal to the difference between the force FB of the cushion-type pneumatic cylinder 34 and the restoring force FK of the spring 36. In the case of an external contact force of zero, the adjusting path (the deflection) of the handling apparatus is, however, limited to the range of the force-displacement characteristic curve which lies to the left of the point of intersection between the spring characteristic curve and the actuator force characteristic curve. Where a contact force is greater than zero, the maximum adjusting path is correspondingly smaller. In order actually to be able to utilize the theoretically possible maximum lift of the linear actuator, it would be desirable for the spring characteristic curve also to have a falling characteristic curve (see adapted characteristic curve FK'). In the ideal case, the spring characteristic curve would have the identical form as the actuator force characteristic curve. The offset—in this case adjustable by means of changes in pressure—between the characteristic curves then corresponds to the contact force which would be generatable independently of the deflection of the actuator if the characteristic curves were adapted in this manner.

Figure 8:
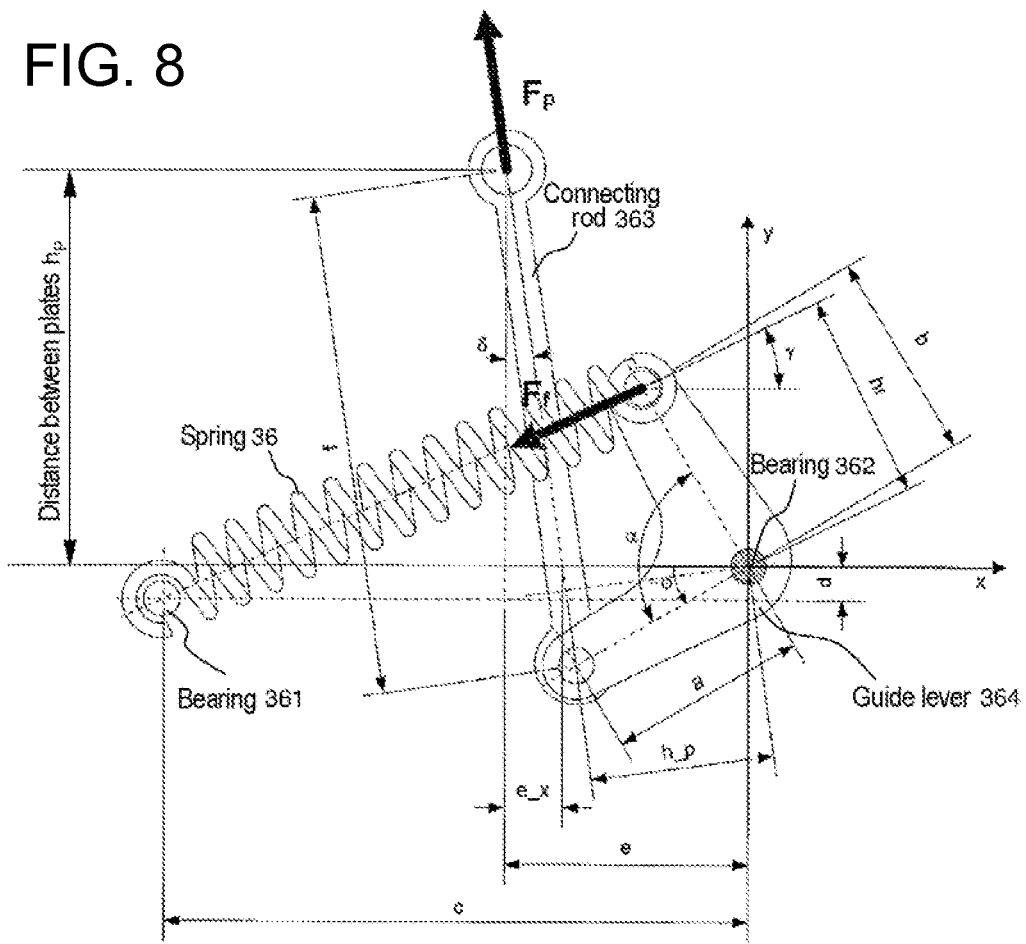
FIG. 8 shows a lever mechanism for adapting the force-displacement characteristic curve of a spring.
Figure 9:
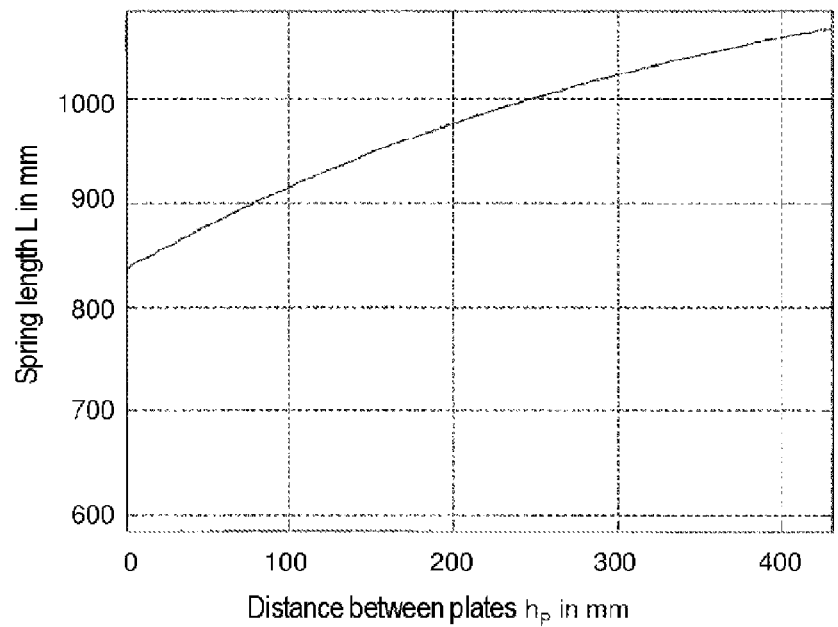
FIG. 9 illustrates (a) the relationship between the spring length and the distance between plates established by the mechanism from FIG. 8 as well as (b) the adapted force-displacement characteristic curve of the mechanism from FIG. 8.
Figure 9:
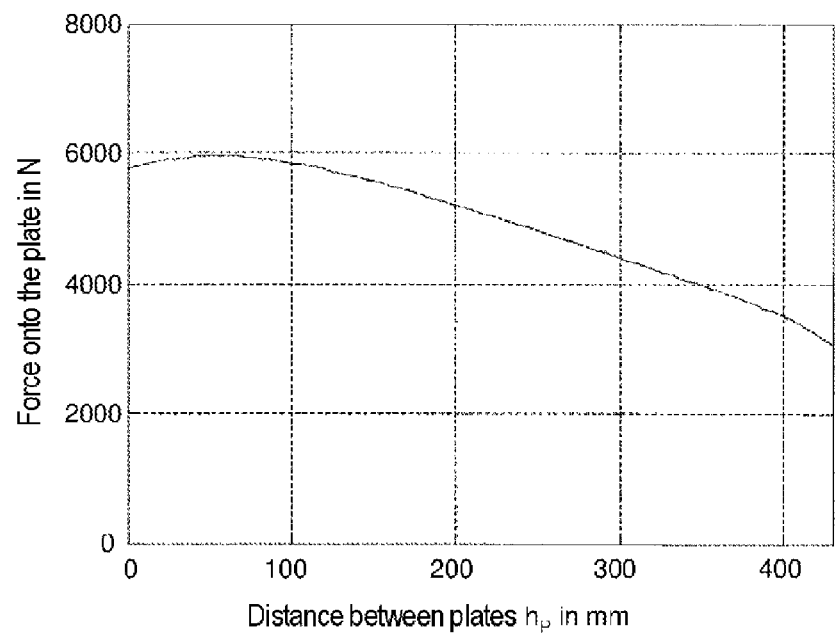

FIG. 8 shows a possibility of how, by means of a simple kinematic arrangement, the spring force characteristic curve is able to be adapted to the characteristic curve of the actuator—at least approximately. In the case of the mechanism shown in FIG. 8, the bearings 361 and 362 are rigidly connected to a flange part (for example the interface 31 to the manipulator) and the top end of the connecting rod 363 is connected to the other flange part (for example the holder 32 for the tool). A guide lever 364, which is for example L-shaped, is pivotably mounted on the bearing 362. The spring 36 (with an approximately linear characteristic curve) is clamped between the end of a leg of the guide lever 364 and the bearing 361. The connecting rod 363 is arranged between the end of the other leg of the guide lever 364 and the second flange part. The spacing between the two flange parts 31 and 32 is shown by means of the reference hP in FIG. 8. The force-displacement characteristic curve of the restoring force which acts between the plates in dependence on the spacing hP is shown in FIG. 9b. FIG. 9a shows the relationship between the length of the spring and the spacing hP. As can be seen in FIG. 8b, the force-displacement characteristic curve of the system shown in FIG. 8, which is made up by the spring and the guide mechanism, is the same as the force-displacement characteristic curve of a cushion-type pneumatic cylinder or of a pneumatic artificial muscle, as a result of which the possible lift of a static-frictionless pneumatic linear actuator is able to be utilized in a considerably better manner.

As a result of the static-frictionless design, a handling apparatus as claimed in the invention can also be operated only as a "supple" (i.e. flexible) sensor unit for the contact force. In this case, the positioning of the tool is effected in part or exclusively by means of the manipulator (cf. manipulator 20 in FIG. 1). In this case, both a "mixed mode" and a "sensor-guided mode" are conceivable. In the "mixed mode", small and high-frequency adapting of positions and regulating the force are assumed by the handling apparatus, whereas the large-area, higher-ranking movement (rough positioning) is ensured by the manipulator. In the "sensor-guided mode", the handling apparatus acts as a passive sensor unit and the regulating work is assumed by the manipulator. The flexibility of such a sensor unit nevertheless allows the force to be regulated in a substantially jerk-free manner. In pure sensor mode, the flexibility of the apparatus, that is the force-displacement performance characteristic (also called impedance) is also actively adjustable and adaptable to the respective application.

Information (measuring data) determined by means of the handling apparatus concerning the contact force and/or the position of the tool in relation to the end effector flange of the manipulator is fed back to the drive (or the drive units) of the manipulator in both cases (during "mixed mode" as well as "sensor-guided mode). In contrast to this, in "stand alone mode" the handling apparatus works independently of the manipulator and there is no feedback of measured data determined by means of the handling apparatus to the drive control means or drive regulating means of the manipulator. The manipulator executes a predetermined movement (for example for positioning the tool on the workpiece). Precision control and regulating the force are assumed by the handling apparatus, as described above, independently of the manipulator.

As a result of the inherent elasticity of the static-frictionless linear actuator and the restoring spring, the handling apparatus (both in the mode as active flange and in pure measuring mode) protects the manipulator from jerks, impacts and similar short-term events which result in a sudden increase in the contact force and for which a usual robot regulating means is not able to compensate.

In order to increase the accuracy of the force measuring, a load cell can be arranged between a linear actuator and a flange part 31 or 32 such that the force is not only determined in an arithmetical manner (for example from the direction of movement, the pressure and the deflection) but is also able to be measured directly.

One example of the invention relates to a method for handling objects or for processing surfaces with a manipulator, a handling apparatus which is arranged on said manipulator as shown, for example, in FIGS. 2 to 5 as well as a tool which comes into contact with the object or the surface. The method includes positioning the tool by correspondingly deflecting the handling apparatus such that contact force corresponds to a predetermined required value, it being possible for the required value to be dependent on the position of the manipulator. The method additionally includes handling the object (for example positioning, stacking, etc,) or processing the surface (for example grinding, polishing, etc.). In this case, the position of the tool and the contact force determined by means of the handling apparatus are continuously monitored during the operation of handling or processing and where required also logged. Consequently, a processing report can be prepared for every workpiece and the workpiece can be correspondingly classified (for example as B grade goods if certain force tolerances have not been adhered to during processing or handling).

Some Important Aspects of a Handling Apparatus as Claimed in the Invention are Summarized Below as an Example:

A handling apparatus (active flange) which is suitable for automated contact tasks includes as a mechanical interface a first flange part for releasably or fixedly connecting the handling apparatus to a manipulator as well as a second flange part which is movable in relation to the first flange part and is realized as a holder for receiving a tool. At least one gearless, static-frictionless adjusting element serves for positioning the holder in relation to the first flange part. In addition, a sensor device is provided for determining directly or indirectly the force acting on the at least one adjusting element. Finally, a closed-loop control device ensures—on contact between a tool which is mounted on the holder and a surface—the regulating of the contact force in accordance with a predeterminable force progression.

In addition, a mechanical guide device, which is mounted free of static-friction (for example by means of a roller bearing or an air-cushion bearing), can be arranged between the two flange parts, said mechanical guide device blocking all mechanical degrees of freedom except for those which are adjustable by the at least one adjusting element. In the event of one single degree of freedom, for example a rotationally fixed shaft guide can block all degrees of freedom as far as up to the one translatory degree of freedom which corresponds to the movement of the adjusting element.

The handling apparatus can additionally have a spring element which generates a restoring force between the two flange parts which is directed in opposition to the effect of the force of the static-frictionless adjusting element. The net force exerted onto an external body (for example the workpiece) by the handling apparatus corresponds accordingly to the difference between the actuator force and the restoring force of the spring.

Each gearless static-frictionless adjusting element as well as the abovementioned spring element has a characteristic force-displacement characteristic curve. In the case of a simple spring, said characteristic curve is linearly ascending, in the case of a pneumatic actuator it is descending and pressure-dependent. Together said characteristic curves determine the elastic performance characteristic of the handling apparatus (i.e. net force versus the position of the holder in relation to the manipulator). The closed-loop control device can be realized for the purpose of adjusting the force-displacement characteristic curve of the adjusting element (or of the adjusting elements) such that the handling apparatus has a predetermined elastic performance characteristic.

As already mentioned, the adjusting element can be a pistonless pneumatic actuator, a static-frictionless pneumatic cylinder or an electric gearless direct drive. In the case of the electric direct drive, there is a current-dependent force-displacement characteristic curve in place of a pressure-dependent force-displacement characteristic curve.

In order to adapt the force-displacement characteristic curve of the spring element to the characteristic curve of the actuator in an at least approximate manner, the outwardly effective force-displacement characteristic curve of the spring can be modified by a kinematic arrangement (i.e. a lever mechanism) to the force-displacement characteristic curve of the static-frictionless pneumatic adjusting element.

The sensor device can have a positional sensor for each adjusting element for measuring the length of the respective adjusting element. As an alternative to this, it is possible to provide a sensor which is realized for the purpose of determining the position of the holder in relation to the first flange part (i.e. to the manipulator).

In the case of pneumatic actuators, the sensor device can be realized for the purpose of calculating the force acting on the adjusting element as well as the position of the holder in relation to the first flange part from the measured length of the at least one adjusting element and from the pressure prevailing in the adjusting element.

For applications under water or for applications where air flows are a nuisance, an exhaust air duct of the pneumatic adjusting element can be connected to a hose which directs the exhaust air away from the handling apparatus such that no air flows occur in the vicinity of the apparatus. In addition, the handling apparatus can be sealed against the ingress of water and/or dust.

A further example of the invention relates to a system including a manipulator with at least one degree of freedom, a handling apparatus fastened on the manipulator as described above and a tool arranged on the handling apparatus for contact tasks. In addition, a regulating unit for regulating the force exerted onto a workpiece by the tool is provided, wherein the regulating unit is realized for the purpose of roughly positioning the workpiece by means of the manipulator and of carrying out the precise positioning and the regulating of the force by means of the handling apparatus.

As an alternative to this, the handling apparatus is operated in a purely passive manner as a sensor unit and the force is regulated just by means of the drive of the manipulator. In both cases there is mechanical decoupling between the workpiece and the inert mass of the manipulator by means of the adjustable elasticity of the handling apparatus.

The invention claimed is:

1. A handling apparatus for automated contact tasks, the handling apparatus comprising:
   a mechanical interface for connecting the handling apparatus to a manipulator;
   a holder movably mounted relative to said interface and configured for receiving a tool;
   at least one gearless adjusting element for positioning said holder in relation to said interface to the manipulator;
   a sensor device for determining a force acting on said at least one adjusting element; and
   a closed-loop controller configured for:
      pressing said holder with an adjustable minimum force against a stop as long as there is no contact between the handling apparatus and a surface;
      controlling the contact force according to a predeterminable force progression when there is contact between the handling apparatus and a surface, wherein, once contact has been recognized, the contact force is increased from the minimum force to a predeterminable required force; and
      recognizing loss of contact and, as a reaction, for reducing the force provided by said at least one gearless adjusting element to the minimum force.

2. The handling apparatus according to claim 1, wherein said at least one gearless adjusting element is a static-frictionless adjusting element selected from the group consisting of a pneumatic cylinder and a pneumatic muscle.

3. The handling apparatus according to claim 1, wherein said closed-loop controller is configured to effect an increase of the contact force from the minimum force to the required force or a reduction of the force provided by said at least one gearless adjusting element from the required force to the minimum force linearly inside predeterminable time intervals.

4. The handling apparatus according to claim 1, wherein:
said sensor device comprises a displacement sensor for measuring a relative position between said interface and said holder; and
said closed-loop controller is configured of recognizing contact when said holder is moved in relation to said interface in opposition to a direction of the minimum force.

5. The handling apparatus according to claim 4, wherein said closed-loop controller is configured to recognize a loss of contact when a change in a speed of said holder relative to said interface exceeds a predetermined threshold value.

6. The handling apparatus according to claim 5, wherein, when the loss of contact is recognized, the speed of said holder in relation to said interface is stored and said controller is configured to recognize contact when the speed has fallen below the predetermined threshold value again.

7. The handling apparatus according to claim 1, wherein:
said sensor device comprises a displacement sensor for measuring a relative position between said interface and said holder; and
said closed-loop controller is configured for recognizing lack of contact when said holder is moved toward an end stop as a result of the force provided by said at least one gearless adjusting element.

8. The handling apparatus according to claim 1, wherein said handling apparatus further comprises a mechanical guide device mounted in a static-frictionless manner between said holder and said interface to the manipulator.

9. The handling apparatus according to claim 1, wherein said handling device further comprises a spring element for exerting a restoring force, which is directed in opposition to the force action of a static-frictionless adjusting element, onto said holder, or said handling device further comprising a double-acting pneumatic cylinder.

10. The handling apparatus according to claim 9, wherein at least one static-frictionless adjusting element and said spring element have force-displacement characteristic curves which together determine a resilient performance characteristic of the handling apparatus, wherein said closed-loop controller is configured for adjusting the force-displacement characteristic curve such that the handling apparatus has a predetermined resilient performance characteristic.

11. The handling apparatus according to claim 9, wherein a force-displacement characteristic curve of said spring is adapted to a force-displacement characteristic curve of said static-frictionless pneumatic adjusting element by way of a kinematic arrangement.

12. The handling apparatus according to claim 1, wherein said adjusting element is a linear actuator selected from the group consisting of a pistonless pneumatic actuator, a static-frictionless pneumatic cylinder, and an electric, gearless direct drive.

13. The handling apparatus according to claim 12, where said sensor device comprises a position sensor for every adjusting element for measuring a length of the respective said adjusting element or for measuring a position of said holder relative to said interface to the manipulator.

14. The handling apparatus according to claim 13, where said sensor device is configured for calculating a force acting on said adjusting element and the position of said holder relative to said interface to the manipulator from a measured length of said at least one adjusting element and from a pressure prevailing in said adjusting element.

15. The handling apparatus according to claim 1, where said adjusting element is a pistonless pneumatic actuator or a static-frictionless pneumatic cylinder, wherein an exhaust air duct of said adjusting element is connected to a hose for conducting the exhaust air away from said handling apparatus.

16. A method for handling an object or for processing a surface with a manipulator, the method comprising:
providing the manipulator with a handling apparatus and a tool to come into contact with the object or the surface, the handling apparatus comprising a mechanical interface for connecting a handling apparatus to a manipulator;
providing a holder movably mounted relative to said interface and configured for receiving a tool, and at least one gearless adjusting element for positioning said holder in relation to said interface to said manipulator;
providing a sensor device for determining a force acting on said at least one adjusting element,
providing a closed-loop controller configured for:
pressing said holder with an adjustable minimum force against a stop as long as there is no contact between the handling apparatus and a surface, and
controlling the contact force according to a predeterminable force progression when there is contact between the handling apparatus and a surface, wherein, once contact has been recognized, the contact force is increased from the minimum force to a predeterminable required force;
actuating the adjusting element to provide an adjustable minimum force and monitoring whether contact between the tool and the surface is established;
positioning the tool by at least one of the following: correspondingly actuating the manipulator or deflecting the handling apparatus until contact between the tool and the surface is detected;
increasing a force provided by the adjusting element to increase the contact force from the minimum value to a predetermined required value inside a certain time period;
handling the object or processing the surface and monitoring whether loss of contact occurs; and
reducing the force provided by the adjusting element to the minimum force when loss of contact is recognized.

17. The method according to claim 16, which further comprises logging the position and the contact force, which are determined from the measured values provided by the handling apparatus, during the handling or processing operation.

18. The method according to claim 16, which further comprises, during the handling or processing operation, checking whether the contact force lies inside a predetermined tolerance range around a required value.

19. The method according to claim 16, which comprises automatically adapting the contact force to correspond to a predetermined force-displacement characteristic curve in dependence on a deflection of the handling apparatus.

20. The method according to claim 16, which comprises increasing the contact force substantially linearly proceeding from a minimum force up to a required force.

21. The method according to claim 16, which comprises increasing a contact force inside a predetermined time interval proceeding from a minimum force up to a required force.

22. The method according to claim 16, which comprises recognizing a lack of contact or loss of contact when the handling apparatus moves to an end stop.

23. The method according to claim 16, which comprises recognizing loss of contact when a change in a speed of the holder of the handling apparatus relative to the interface of the handling apparatus with the manipulator exceeds a predetermined threshold.

24. The method according to claim 23, which comprises, when loss of contact is recognized, storing the speed of the holder relative to the interface and recognizing contact when the speed has fallen below the predetermined threshold value again.

\* \* \* \* \*